United States Patent
Hosoya

[19]
[11] Patent Number: 6,082,833
[45] Date of Patent: Jul. 4, 2000

[54] HYDRAULIC CONTROL VALVE DEVICE

[75] Inventor: Yukio Hosoya, Hamakita, Japan

[73] Assignee: Misshinbo Industries, Tokyo, Japan

[21] Appl. No.: 09/150,211

[22] Filed: Sep. 9, 1998

[30] Foreign Application Priority Data

Sep. 12, 1997 [JP] Japan .................................. 9-267835

[51] Int. Cl.[7] .................................................. B60T 8/36
[52] U.S. Cl. ...................................... 303/119.2; 303/900
[58] Field of Search ........................... 303/119.2, 113.1,
303/900, 901, 119.3, 116.1, 113.2, 117.1;
251/129.19, 129.15, 129.14, 129.02, 129.05,
129.07, 129.08; 137/596.17, 504, 627.5,
630, 614.16, 625.65

[56] References Cited

U.S. PATENT DOCUMENTS

| | | | |
|---|---|---|---|
| 5,356,211 | 10/1994 | Fritsch .................................. | 303/119.2 |
| 5,388,899 | 2/1995 | Volz et al. ............................ | 303/119.2 |
| 5,647,644 | 7/1997 | Volz et al. ............................ | 303/113.1 |
| 5,664,849 | 9/1997 | Burgdorf et al. ....................... | 303/900 |
| 5,669,675 | 9/1997 | Mueller et al. ......................... | 303/900 |
| 5,673,979 | 10/1997 | Kuromitsu et al. .................. | 303/119.2 |
| 5,683,150 | 11/1997 | Burgdorf et al. ....................... | 303/900 |
| 5,704,587 | 1/1998 | Kuromitsu et al. .................. | 303/119.2 |
| 5,865,213 | 2/1999 | Scheffel et al. ....................... | 303/119.2 |
| 5,967,627 | 10/1999 | Hosoya et al. ....................... | 303/119.2 |
| 5,971,501 | 10/1999 | Hosoya ................................ | 303/119.2 |

*Primary Examiner*—Douglas C. Butler
*Attorney, Agent, or Firm*—Arent Fox Kintner Plotkin & Kahn

[57] ABSTRACT

Hydraulic control valve device effectively reducing NVH effect. The hydraulic control valve device comprises the cap member (39) at the distal end of the smaller diameter portion (32b) of the magnet core and a throttled channel (39b) between the cap member (39) and the bottom portion (43a) of the outer piston (43), wherein fluid flow is switched to the throttled channel (39b) when the outer piston slides in the direction to close the communication hole (39a) of the bottom portion (39) of the smaller diameter portion (32b) by the hydraulic pressure difference between the hydraulic pressure at the master cylinder side and the wheel cylinder side.

15 Claims, 10 Drawing Sheets

HYDRAULIC CONTROL VALVE DEVICE

BACKGROUND OF THE INVENTION

This invention relates to a hydraulic control valve device for use in a system which controls vehicle slips or vehicle behavior, such as an anti-lock braking system (hereinafter ABS) or a traction control system (hereinafter TCS) a vehicle behavior control. More specifically, this invention relates to a hydraulic control valve device which uses an open channel during normal braking operation and switches to a throttled channel during hydraulic pressure control.

A brake device which prevents wheel locking by electronically controlling brake hydraulic pressure when applying immediate braking or immediately starting is publicly known. In this type of device, a metal sound, i.e., noise, vibration, harshness, (NVH) is created while switching the electromagnetic normally open valve (hydraulic control valve device hereinafter) to the closed position. In order to prevent NVH, a switching valve, operated by hydraulic pressure difference, is recommended to be installed at the upstream side of an inlet valve located in a main hydraulic braking line.

Although the above-mentioned preventive measure may reduce NVH to a certain degree, NVH and vibration still occur leaving room for improvement.

OBJECTS AND SUMMARY OF THE INVENTION

This invention is made to resolve the above-mentioned problem. To that end, an object of the invention is to provide a hydraulic control valve device which further effectively improves the reduction of the NVH effect.

Another object of the invention is to provide a hydraulic control valve device which enables smooth pressure reduction with certainty when releasing the braking force.

Further, another object of the invention is to provide a hydraulic control valve device which creates a smooth fluid flow by reducing the fluid channel resistance by the switching valve and prevents malfunction of the device.

This invention is a hydraulic control valve device which comprises a sleeve fixed in a bore of the housing provided in a main braking line connecting between a master cylinder and a wheel cylinder, an armature slidably installed in the sleeve and having an inlet valve unit which opens and closes by electromagnetic force, a magnet core, in which the inlet valve unit is installed, fixed in the bore of the housing together with the sleeve and having a smaller diameter portion extending into the housing, a coil assembly electromagnetically operating the armature, a valve mechanism inside the magnet core, a normally open inlet valve comprising the sleeve, the armature, the magnet core, the coil assembly, and the valve mechanism, a switching valve provided at the upstream side of the normally open inlet valve, wherein the switching valve provides an open channel between the master cylinder and wheel cylinder when in a normal braking and switches to a throttled channel operable by hydraulic pressure difference between the master cylinder side and wheel cylinder side when in hydraulic control, wherein the switching valve comprises an outer piston slidably provided exterior on the smaller diameter portion of the magnet core, dividing the bore formed in the housing into a first hydraulic chamber connected to the master cylinder and a second hydraulic chamber connected to the wheel cylinder, the outer piston being formed as a sleeve with a closed bottom portion, and a spring which applies the spring force to move the outer piston toward the bottom surface side of the bore, wherein at least one communication hole functions as the main braking line at the bottom of the smaller diameter portion of the magnet core, and a throttled channel defined between the bottom of smaller diameter portion of the magnet core and the facing surface of the bottom portion of the outer piston facing the bottom of the smaller diameter portion which switches when the outer piston slides in the direction to close the communication hole functioning as an open channel by the pressure difference between the hydraulic pressure of the master cylinder side and the wheel cylinder side.

The invention further is a hydraulic control valve device as above, in which the inlet valve comprises an inner piston slidably provided in the smaller diameter portion of the magnet core, an inlet valve seat formed on the surface of the inner piston facing the inlet valve unit, a cap member located at the distal end of the smaller diameter portion, and an inner spring between the inner piston and the cap member absorbing an operation impact of the valve mechanism comprising the inlet valve unit and inlet valve seat when closing the inlet valve, wherein the at least one communication hole, functioning as the main braking line, is provided in the cap member and the throttled channel is provided between the bottom of the cap member and the bottom portion of the outer piston facing the cap member and switches when the outer piston slides in the direction to close the at least one communication hole functioning as a large channel by the hydraulic pressure difference of the hydraulic pressure between the master cylinder side and wheel cylinder side.

The invention still further is a hydraulic control valve device as above, wherein the throttled channel, connecting between the at least one communication hole in the cap member and a bore through the bottom portion of the outer piston, is formed in either the cap member or the facing surface of the bottom of the outer piston.

The invention still further is a hydraulic control valve device as above, wherein a small diameter hole, functioning as the throttled channel communicating with a bore through the bottom portion of the outer piston is formed in the cap member.

The invention still further is a hydraulic control valve device as above, wherein a release channel is formed either between the inner piston and an inner circumferential surface of the smaller diameter portion of the magnet core or in the inner piston, and hydraulic pressure of the wheel cylinder is released to the master cylinder via the release channel when the hydraulic pressure of the cylinder becomes lower than the certain amount below hydraulic pressure of the wheel cylinder.

The invention still further is a hydraulic control valve device as above, further comprising a reverse stop valve to prevent flow from the master cylinder side of the release channel to the wheel cylinder side, said stop valve including a cylindrical protuberance formed either at the end surface of the valve seat side of the inner piston or the stepped portion in the smaller diameter portion of the magnet core facing the end surface of the valve seat side, flow through the release channel being stopped by the cylindrical protuberance and either the end surface of the valve seat side abutting against the cylindrical protuberance or the stepped portion in the smaller diameter portion abutting against the cylindrical protuberance.

The invention yet further is a hydraulic control valve device as above, wherein an auxiliary throttled channel is formed by a cavity or hole between the bottom portion of the outer piston and the bottom of the bore of the housing.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

The first embodiment of the invention is explained with reference to FIGS. 1–7.

Figure 7:
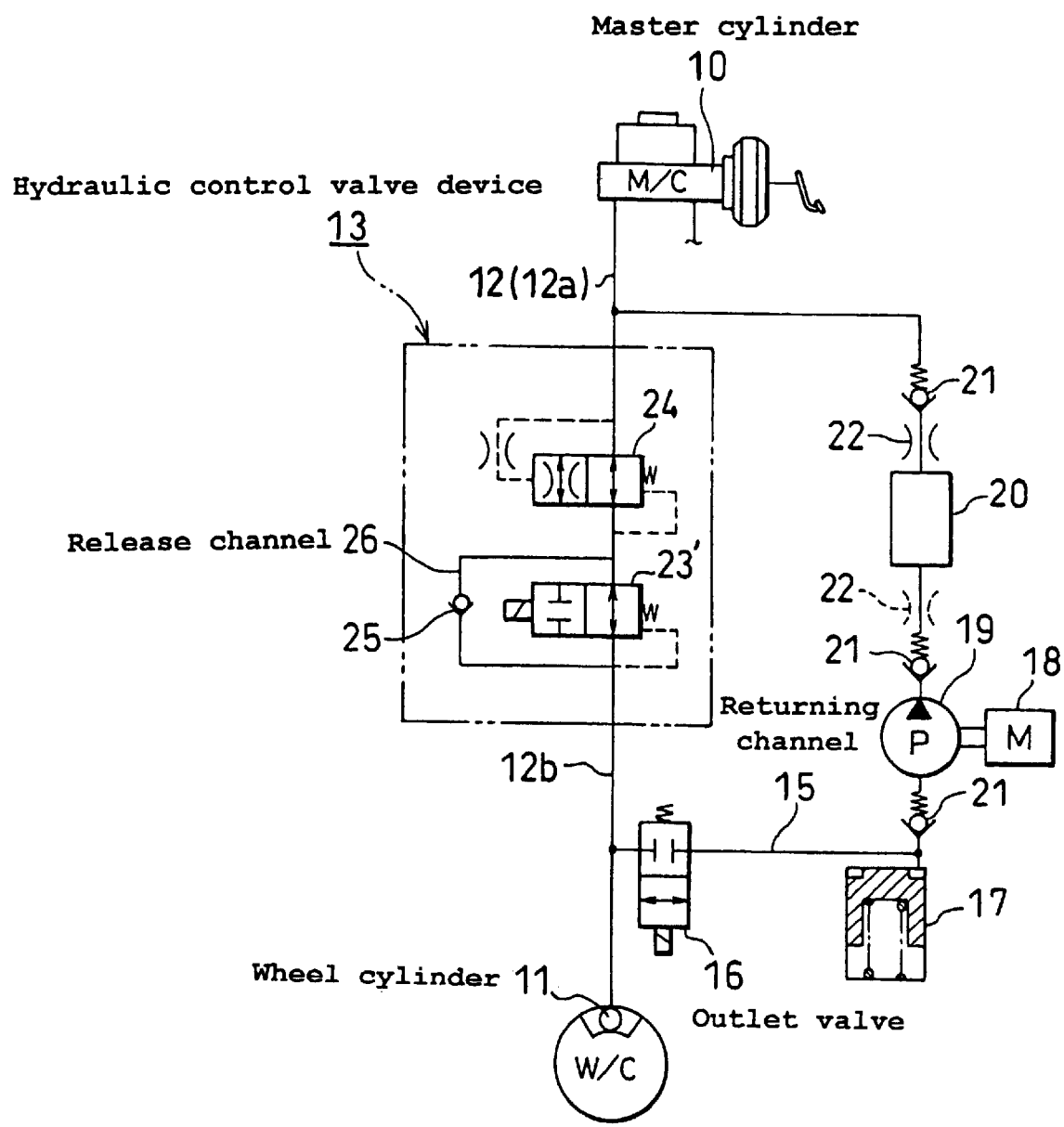
FIG. 7 is a hydraulic circuit view relating to the hydraulic brake device with the hydraulic control valve device.

FIG. 7 is a hydraulic circuit diagram relating to the hydraulic brake device for an ABS equipped vehicle.

A main line 12 is formed between a master cylinder 10 and a wheel cylinder 11. A normally open hydraulic control valve device 13 of this invention is provided in the main line 12. A return line 15 is connected to the main line 12 between the wheel cylinder 11 side and the master cylinder 10 side of the hydraulic control valve device 13. That is, the hydraulic control valve device is located between the two ends of the return line 15. A normally closed outlet valve 16, an auxiliary reservoir 17, a hydraulic pump 19 operated by a motor 18, and a damping chamber 20 are arranged in the return line 15 in series to supply the hydraulic pressure of the wheel cylinder 11 to the upstream side of the hydraulic control valve device 13, i.e. to the main line passage 12a at the master cylinder 10 side via the outlet valve 16 and the hydraulic pump 19.

A reverse stop valve 21 is provided in the return line 15 together with reduced area throttle devices 22, 22.

The hydraulic control valve device 13 of the present invention is a combination valve comprising a normally open inlet valve 23 operable by the electromagnetic force and a normally open switching valve 24 operable by hydraulic pressure difference. The switching valve 24 is located at the upstream side of the inlet valve 23.

A release line 26 with a reverse stop valve 25 is provided in the main line 12 between the upstream and downstream sides of the normally open inlet valve 23.

The switching valve 24 is a normally open two-position, two-direction valve which operates by hydraulic pressure difference. The valve switches from an open position to a throttled position when the hydraulic pressure difference between the master cylinder 10 and the wheel cylinder 11, which is affecting the respective chambers of the valve, is more than a certain amount.

Figure 1:
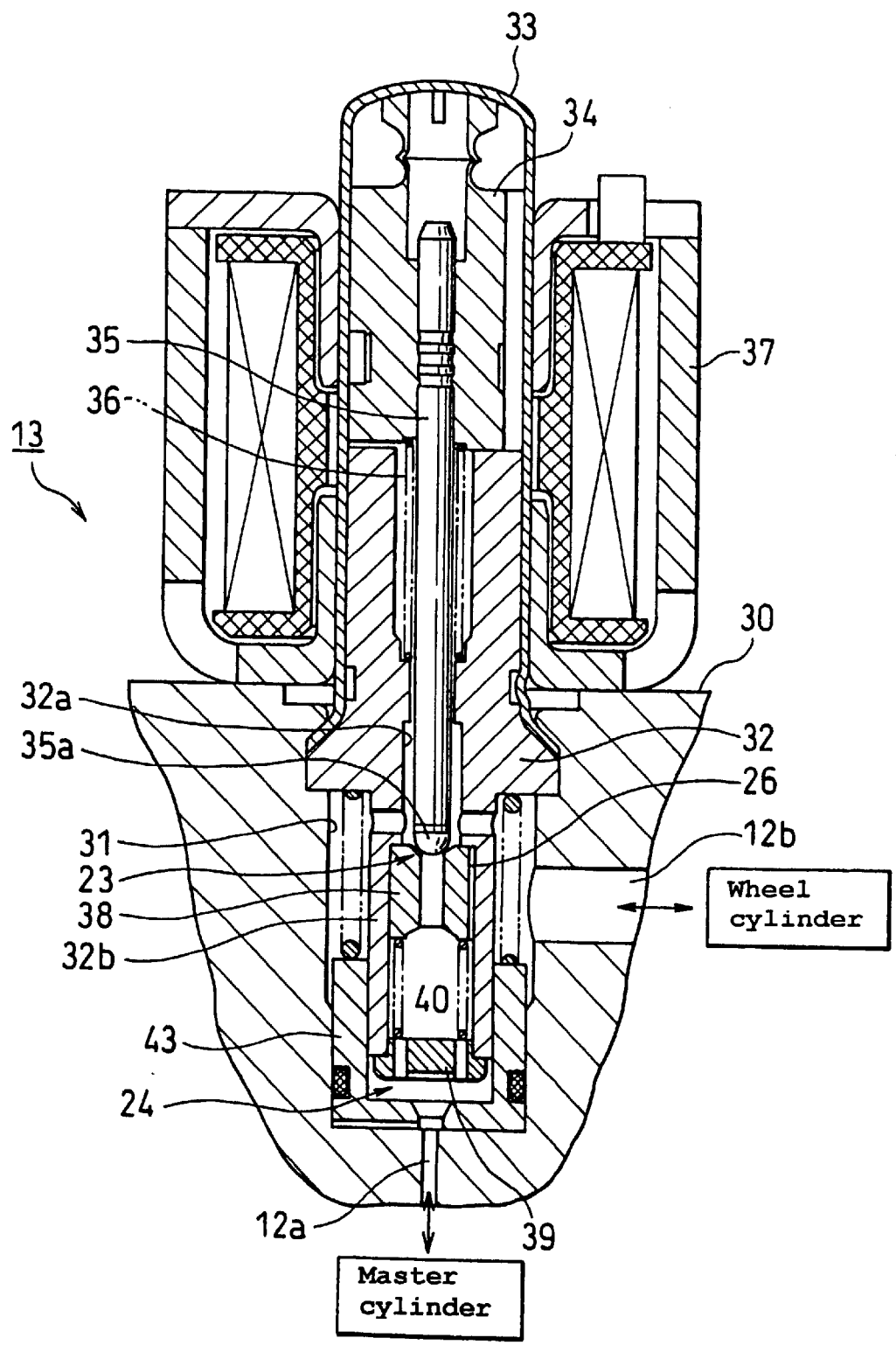
FIG. 1 is a cross-section view of the hydraulic control valve device according to the present invention.

FIG. 1 is a cross-sectional view of the hydraulic control valve device 13 which shows a housing 30, a stepped bore 31 in the housing having a bottom, a main line passage 12a connecting through the bore 31 to the master cylinder 10, and a main line passage 12b connecting to the wheel cylinder 11.

A magnet core 32 of a solenoid valve is installed in the bore 31 and is fixed to the housing 30. That is, a skirt portion of the dome-shaped sleeve 33 exterior to the magnet core 32 is affixed to the housing by a technique such as by caulking. An armature 34 is slidably installed in the sleeve 33. A return spring 36 is installed between the armature 34 and the magnet core 32. The armature 34 and a valve stem 35 are inserted in the stem hole 32a of the magnet core 32.

A donut-shaped coil assembly 37 is provided exterior to the sleeve 33.

The above is substantially the same as a known normally open solenoid valve.

Figure 2:
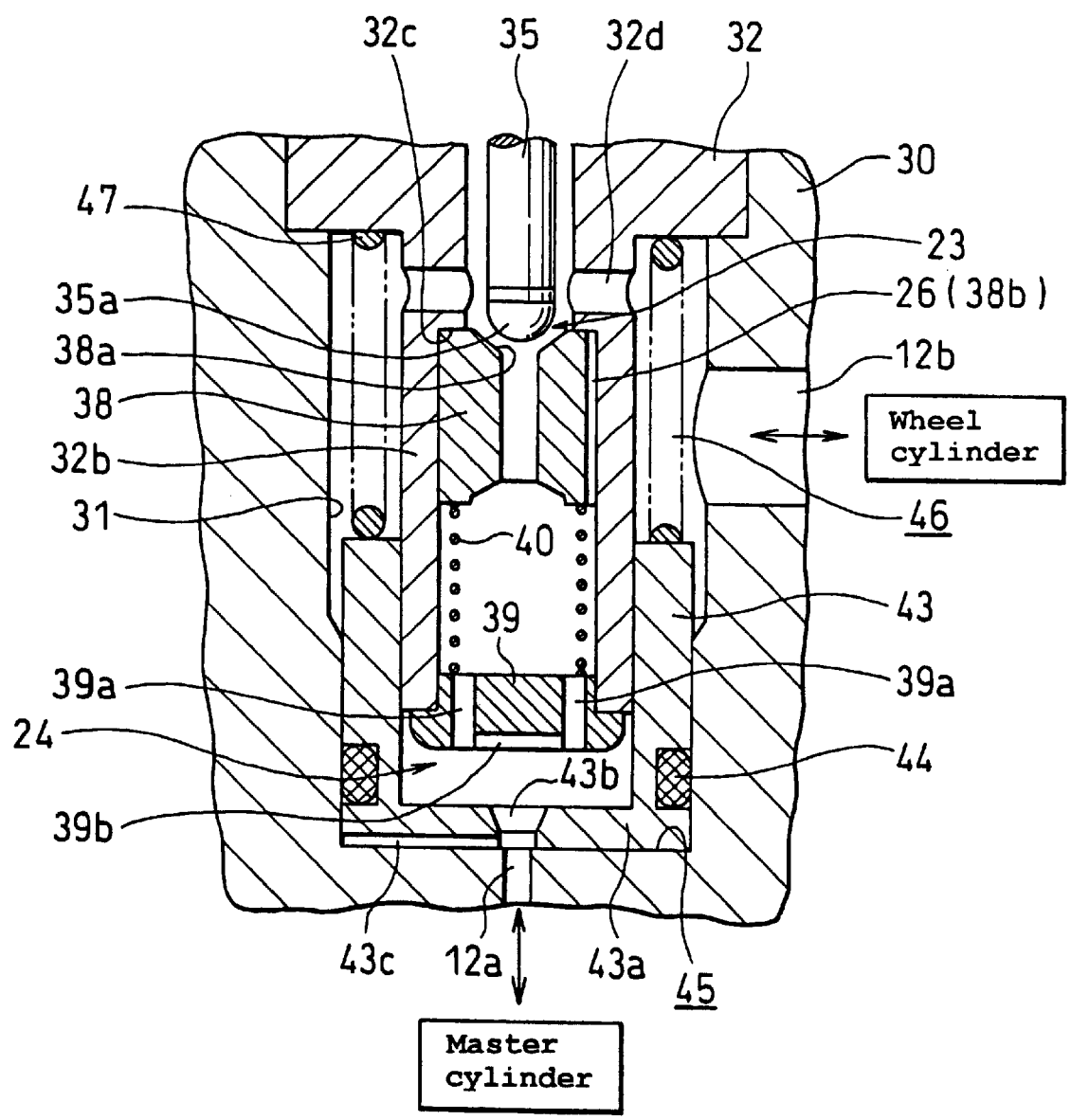
FIG. 2 is an enlarged cross-section view of the vital part of the hydraulic control valve device.
Figure 3:
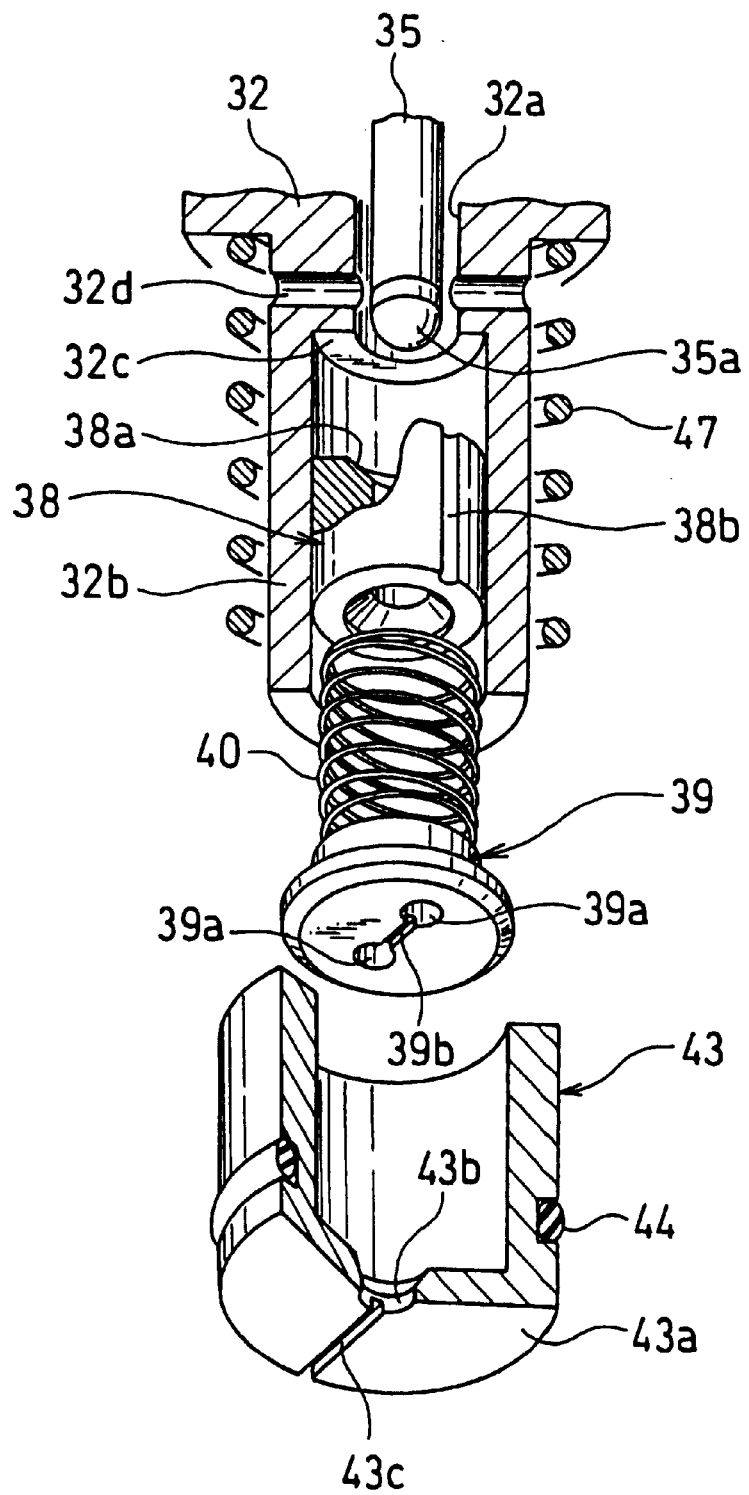
FIG. 3 is an assembly view of the inlet valve and the switching valve of the hydraulic control valve device.
Figure 4:
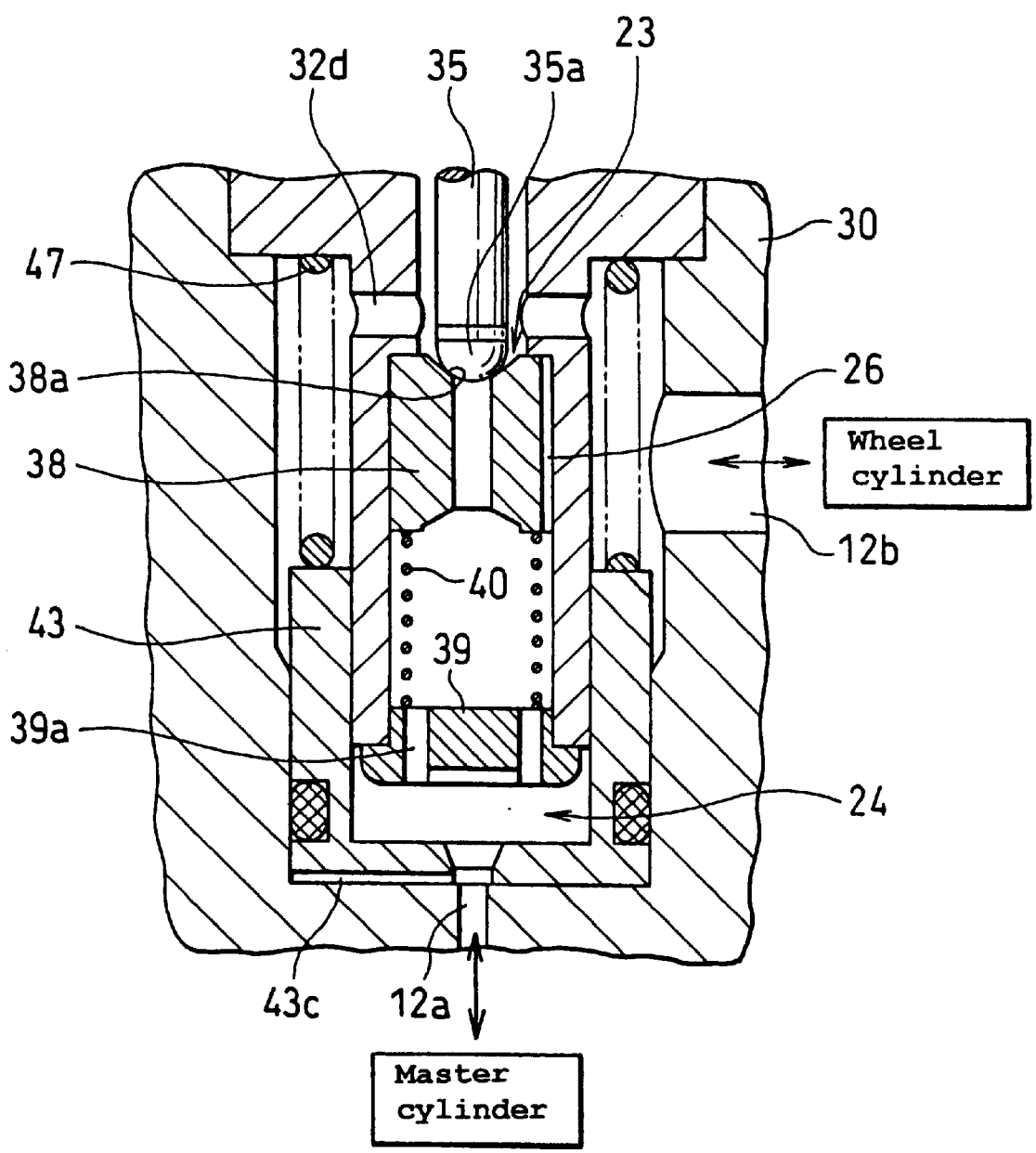
FIG. 4 is an explanation view of the NVH attenuation effect.

FIG. 2 is an enlarged view of the vital part of the hydraulic control valve device 13, and FIG. 3 is an assembly view of the same.

The inlet valve 23 and the switching valve 24 are formed by the inside and bottom of the smaller diameter portion 32b of the magnet core 32.

A cylindrical inner piston 38 is slidably installed in the smaller diameter portion 32b of the magnet core 32. An inner spring 40 is provided between a cap member 39 of the distal end of the smaller diameter portion 32b and the inner piston 38. The upper end of the inner piston 38 in the diagram abuts against a stepped portion 32c of an inner bore of the smaller diameter portion 32b so that the sliding position and travel of the inner piston may be restricted.

The normally open valve mechanism comprises the inlet valve unit 35a formed at the distal end of the valve stem 35 and the inlet valve seat 38a formed on the end surface of the inner piston 38 facing the inlet valve unit 35a. The inlet valve seat 38a is formed on the inner piston 38 so that the movement of the inner piston 38 may eliminate or quiet the metal sound of the inner piston 38 caused when the inlet valve unit 35a reaches the inlet valve seat 38a.

A concave cavity or slot is formed along the outer circumferential surface of the inner piston 38 defining a release channel 26 together with the inner circumferential surface of the smaller diameter portion 32b. This release channel 26 is closed or shut off when the end surface 38b of the valve seat side of the inner piston 38 abuts against the stepped portion 32c of the smaller diameter portion 32b. The release channel is opened when the end surface 38b of valve seat side of the inner piston separates from the stepped portion 32c.

That is, the channel 26 functions as a release channel which allows the flow only from the below-described second hydraulic chamber 46 (wheel cylinder) side to the main line passage 12a (master cylinder) side as well as a reverse stop valve 25 which prevents the flow from the master cylinder side to the wheel cylinder side.

Also, the release channel 26 may be formed as a small diameter insertion hole in the inner piston 38.

A cylindrical outer piston 43 with a bottom portion 43a is slidably provided exterior to the smaller diameter portion 32b for the switching valve.

A cylindrical sealing material 44 is set on the outer circumferential surface of the outer piston 43. The interior of the bore 31 is closed by the outer piston 43 and the magnet core 32. The interior of the bore 31 is partitioned into a first hydraulic chamber 45 and a second hydraulic chamber 46 by the cylindrical sealing material 44. The first hydraulic chamber 45 connects to the main line passage 12a at the master cylinder side while the second hydraulic chamber 46 connects to the main line passage 12b at the wheel cylinder side. A connection bore 32d, formed in the radial direction in the smaller diameter portion 32b, connects between the main line passage 12a of the master cylinder side and the second hydraulic chamber 46.

An outer spring 47 is provided between an end portion of the magnet core 32 and the end of the opening side of the outer piston 43 and applies spring force on the outer piston 43 toward the first hydraulic chamber 45.

The main line passage 12a is provided at the master cylinder side of the bottom center of the bore 31.

An outer piston bore 43b is provided in the bottom portion 43a of the outer piston 43. This outer piston bore 43b has a large chamfer at the smaller diameter portion 32b side. The bore 43b is chamfered in order to create a smooth fluid flow and to prevent the malfunction of the switching valve at sudden braking.

A cavity or slot 43c is formed along the bottom portion 43a of the outer piston 43 to provide an auxiliary throttled channel. The auxiliary throttled channel 43c is to prevent the malfunction of the outer piston 43.

Further, a plural number of communication holes 39a, 39a are provided in the cap member 39. A concave cavity or slot 39b communicating between the communication holes 39a, 39a is provided in the outer bottom surface of the cap member 39.

Normally, the outer piston 43 forms a large area channel for fluid flow by releasing the communication holes 39a of the cap member 39 by separating from the distal end of the smaller diameter portion 32b by action of the spring force of the outer spring 47. During hydraulic control, the outer piston slides in the direction to compress the outer spring. Then the bottom portion 43a of the outer piston 43 abuts against the cap member 39 to close communication holes 39a. At the same time, the throttled channel is formed by the cavity or slot 39b between the bottom portion 43a and the cap member 39 thereby switching the large area channel to a small area channel.

The normally open switching valve 24 comprises the cap member 39, the outer piston 43, and the outer spring 47.

The throttled channel may be formed in either one of the plane surface of the bottom portion of the cap member 39 and the bottom portion 43a side of the outer piston 43.

At least, a small channel is formed between the bottom portion of the cap member 39 and the bottom portion 43a of the outer piston.

The operation of the hydraulic brake device and the hydraulic control valve device is explained next.

FIG. 7 illustrates the hydraulic circuit diagram during normal braking. When in a normal braking, hydraulic pressure created at the master cylinder 10 is supplied to the main line passage 12a and the switching valve 24 and the inlet valve 23 forming the hydraulic control valve device 13. Then, the hydraulic pressure is supplied to the wheel cylinder 11 via the main line passage 12b to brake the wheels.

According to FIG. 2, the operation of the hydraulic control valve device at a normal braking is explained. The inlet valve unit 35a is separated from the inlet valve seat 38a of the inner piston 38, and the inlet valve 23 is opened.

The communication hole 39a is opened by action of the spring force of the outer spring 47 on the outer piston 43. Accordingly, the master cylinder and wheel cylinder communicate via the large area channel of the inlet valve 23 and the switching valve 24.

If no cavity 43c was provided, a large amount of fluid would be supplied to the first hydraulic chamber and the outer piston 43 could undesirably slide in the direction that the switching valve would throttle the holes 39a. The wheel cylinder would then lack hydraulic pressure when a sudden brake is applied while the switching valve 24 is open. In contrast, when the cavity 43c is provided, the flow to the first hydraulic chamber 45 is restricted to be a small amount, and the outer piston 43 does not operate undesirably and does not cause a lack of hydraulic pressure at the wheel cylinder side upon sudden braking.

ABS Control—Operation of Electric Equipment

Figure 6:
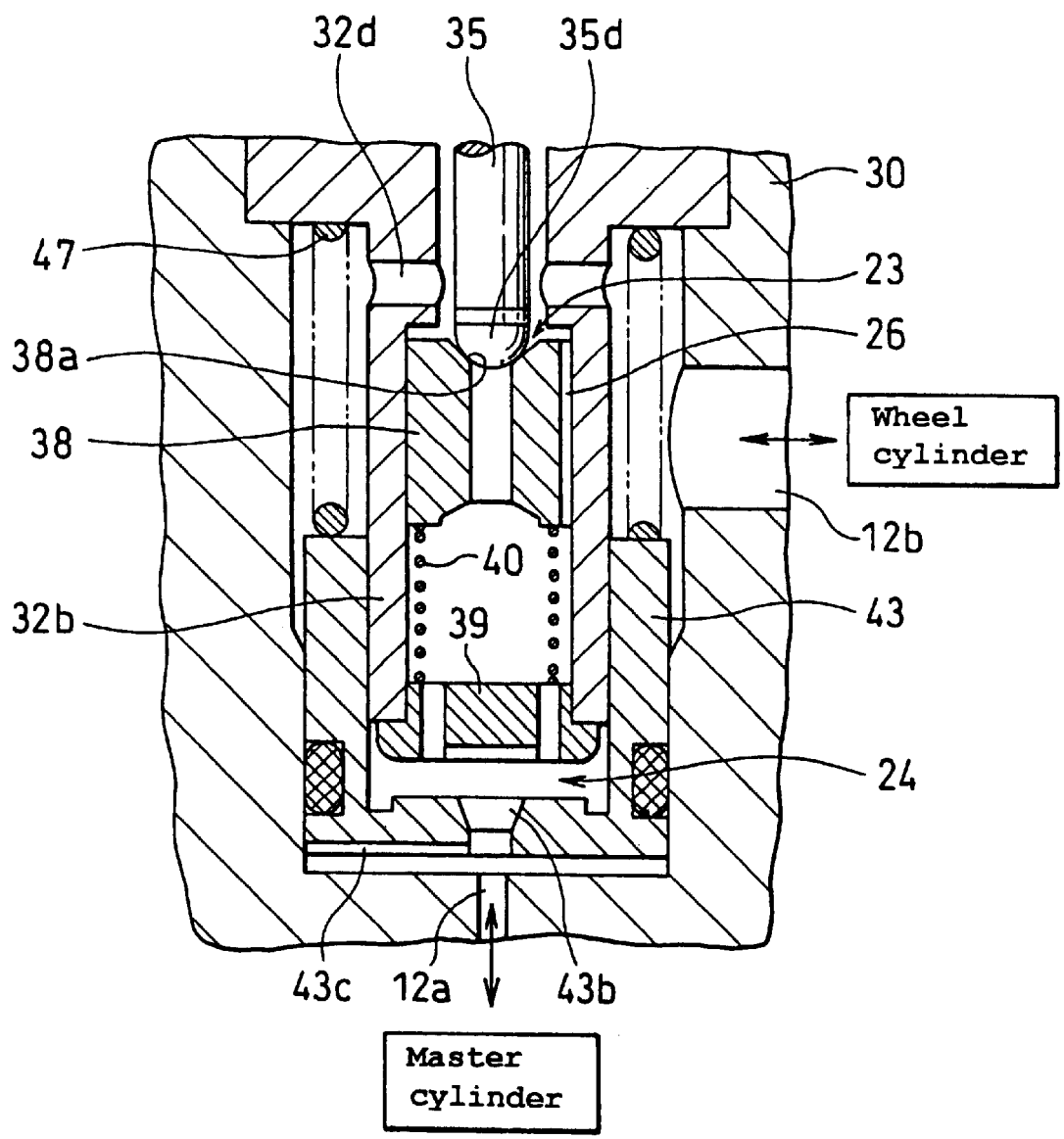
FIG. 6 is an enlarged cross-section view of the vital part of the hydraulic control valve device during releasing.

In FIG. 6, when the electronic control unit senses the condition of the wheel being locked during a braking operation (not shown in the diagrams), it feeds electricity to the inlet valve 23, outlet valve 16, and the motor 18. The pump 19 is activated by the motor 18, and the valve mechanism including the inlet valve 23 and the outlet valve 16 function to open and close. This repeats maintaining, reducing and increasing of the hydraulic pressure of the wheel cylinder 11 to adjust the hydraulic pressure to avoid the wheel locking.

Also, during hydraulic control, fluid from the wheel cylinder 11 is discharged through the outlet valve 16. The discharged fluid is supplied to the main line passage 12a of the upstream side of the hydraulic control valve device 13 via the return line 15.

Attenuation of NVH by the Inlet valve

The operation of the hydraulic control valve device 13 during ABS control is explained here. The electromagnetic force is created when the coil assembly 37 in FIG. 1 is electrified. This electromagnetic force slides the armature 34 downward against the spring force of the return spring 36. According to the sliding of the armature 34, the inlet valve unit 35a reaches the inlet valve seat 38a of the inner piston 38 as in FIG. 4, thereby closing the inlet valve 23. When the coil assembly 37 is de-electrified, the inlet valve unit 35a separates from the inlet valve seat 38a by the force of the return spring 36, thereby opening the inlet valve 23.

When the inlet valve unit 35a reaches the inlet valve seat 38a, the inner piston 38 slides compressing the inner spring 40. Therefore, an impact sound and water (fluid) sound of the brake fluid created by opening and closing of the inlet valve 23 will be absorbed by the contracting of the inner spring 40.

Figure 5:
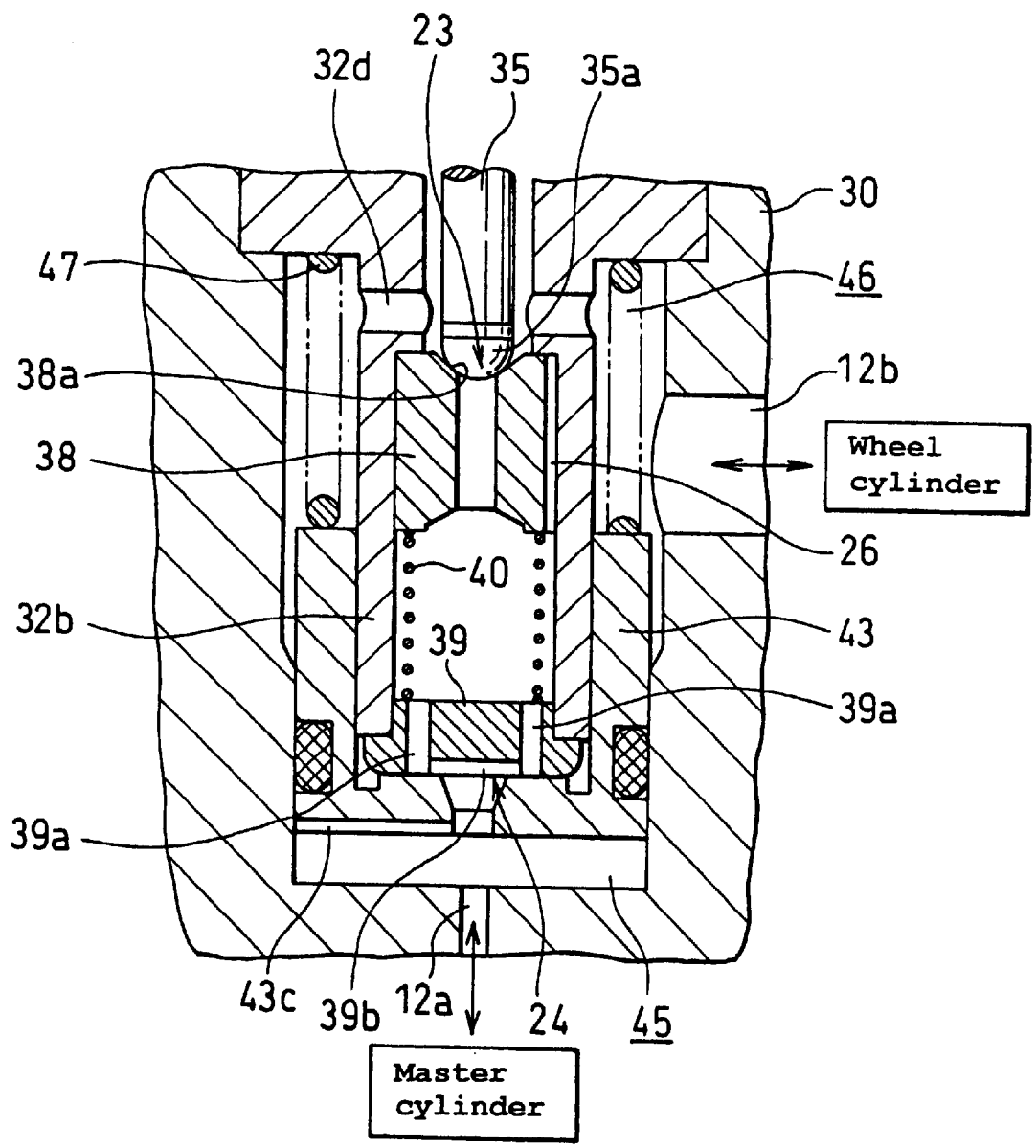
FIG. 5 is an enlarged cross-section view of the vital part of the hydraulic control valve device when switching the large diameter channel of the switching valve to the small diameter channel.

Operation of Switching Valve (FIG. 5)

Closing the inlet valve 23 holds the hydraulic pressure of the second hydraulic chamber 46. Then, if the outlet valve 16 is opened, the hydraulic pressure of the wheel cylinder and the second hydraulic chamber 46 is reduced. Opening the outlet valve 16 does not reduce the hydraulic pressure of the first hydraulic chamber 45; thus, a hydraulic pressure difference is created between the first hydraulic chamber 45 and the second hydraulic chamber 46. When the hydraulic pressure of first hydraulic chamber 45 (master cylinder) becomes larger than the hydraulic pressure of the second hydraulic chamber 46 (wheel cylinder) together with the spring force of the outer spring 47, the outer piston 43 slides in the direction to compress the outer spring against its spring force, and the bottom portion 43a of the outer piston 43 abuts against the bottom surface of the cap member 39 to close the communication holes 39a to form the throttled channel of the cavity or slot 39b between the bottom portion 43a and the cap member 39. As a result, the switching valve 24 switches from the large area channel to the throttled channel.

Release operation (FIG. 6)

After finishing hydraulic control, the hydraulic pressure of the master cylinder side is released. When the hydraulic pressure falls below the predetermined amount of the pressure relative to the hydraulic pressure of the wheel cylinder, the outer piston 43 shifts toward the bottom of the bore 31. The release channel 26 is opened by the inner piston 38 moving backward. Accordingly, a wheel cylinder fluid is released through the release channel 26. Pressure for releasing to the master cylinder is determined according to the spring force of the inner spring 40.

A second embodiment of the invention is explained next. In this and the further embodiments, the identical parts in the previous embodiment use the identical reference signs, and an explanation of those is omitted.

Figure 8:
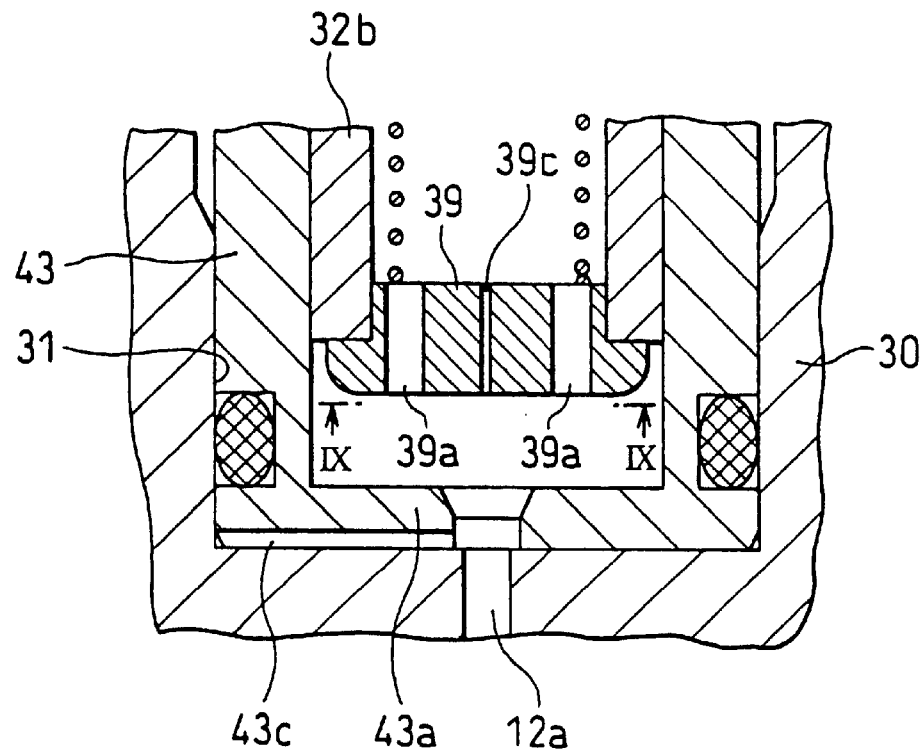
FIG. 8 is an enlarged view of the vital part of the hydraulic control valve device relating to another embodiment with the small diameter hole as a throttled channel in the cap member.
Figure 9:
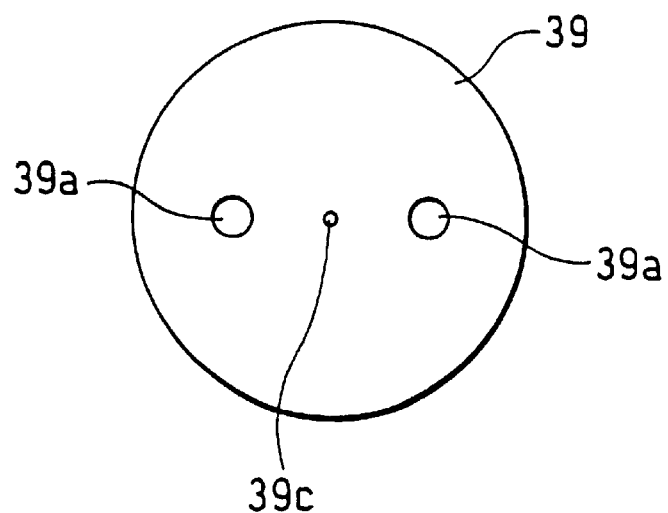
FIG. 9 is a cross-section view taking along line IX—IX.

FIG. 8 and FIG. 9 show a modification for the throttled channel. In this embodiment, a small diameter hole 39c is formed through the center of the cap member 39. The small diameter hole 39c functions as the throttled channel. Normally, the outer piston 43 is separated from the distal end of the smaller diameter portion 32b to open the communication holes 39a of the cap member 39 to form a large area channel. In hydraulic control as explained in the first embodiment, the outer piston 43 slides, and the bottom portion 43a of the outer piston 43 abuts against the cap member 39 to close the communication holes 39a. The throttled channel is then formed by the small diameter hole 39c in the cap member 39 to switch from the large area channel to the throttled channel.

In this second embodiment, the throttled channel defined by the small diameter hole 39c is formed in a straight line parallel to the center of the bore 31. Fluid flows smoothly even when the area of the channel is reduced.

Figure 10:
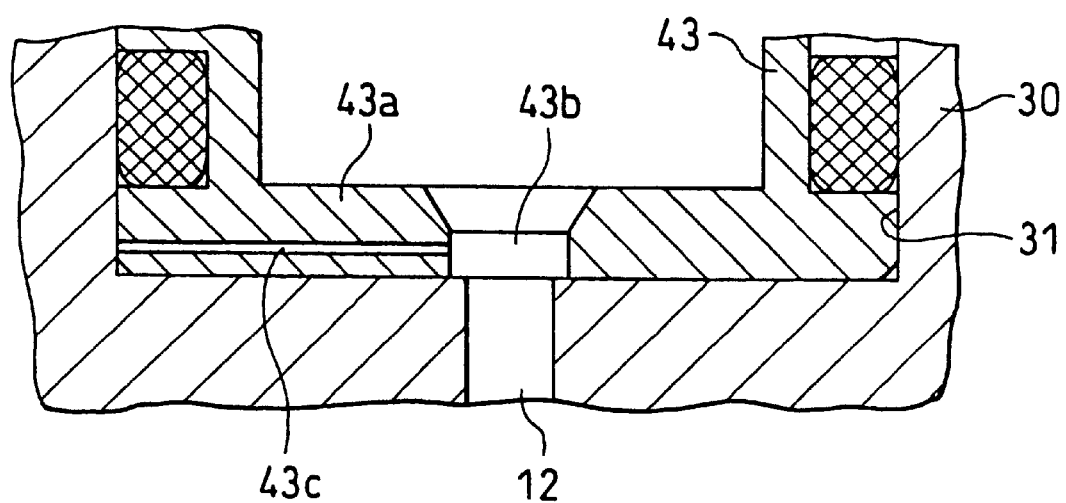
FIG. 10 is an enlarged cross-section view of the bottom portion of the outer piston and bore for another auxiliary throttled channel.

As shown in FIG. 10, a third embodiment of the invention has the auxiliary channel 43c to prevent the malfunction of the outer piston 41 comprise a small hole formed between the outer piston bore 43b and the outer circumferential surface of the bottom portion 43a of the outer piston 43.

Figure 11:
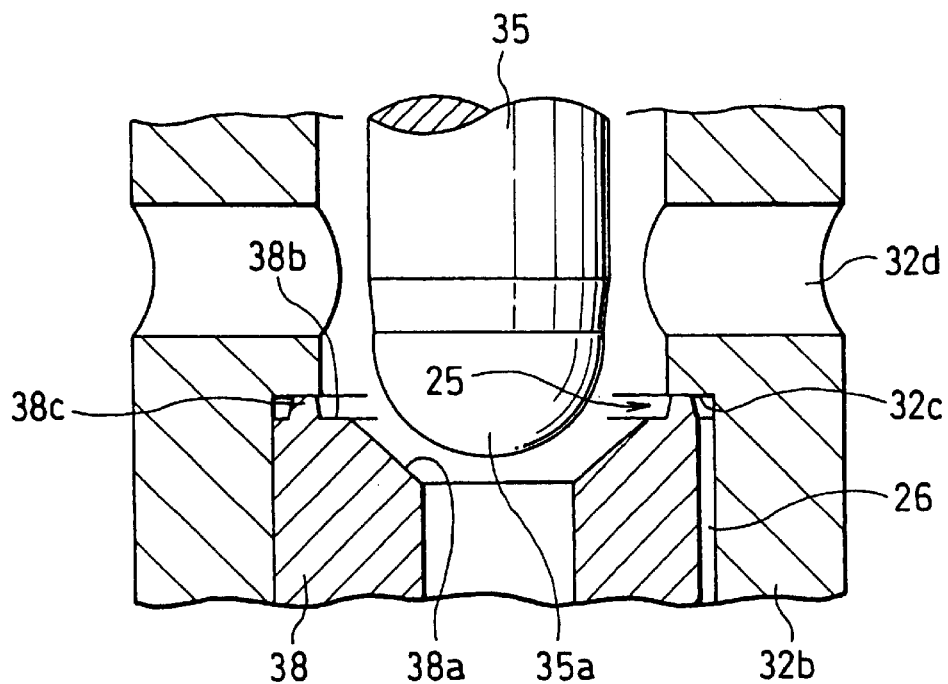
FIG. 11 is an enlarged view of the reverse stop valve relating to another embodiment with the cylindrical protuberance on the end surface of the valve seat side of the inner piston.
Figure 12:
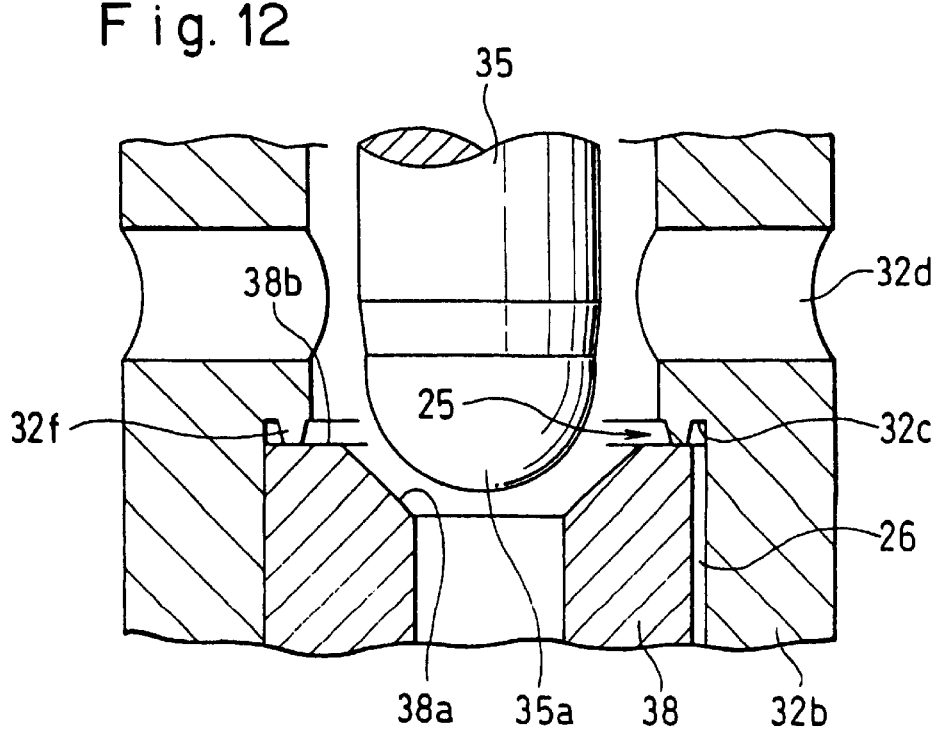
FIG. 12 is an enlarged cross-section view of the reverse stop valve relating to another embodiment with the cylindrical protuberance on the stepped portion in the smaller diameter portion of the magnet core.

FIG. 11 and FIG. 12 show a reverse stop mechanism for a fourth embodiment with such being used along with the release channel 26.

In FIG. 11, a cylindrical annular protuberance 38c is formed on the end surface 38b of the valve seat side of the inner piston 38. In FIG. 12, a cylindrical annular protuberance 32f is formed on the stepped surface 32c in the smaller diameter portion 32b of the magnet core.

In both examples, by abutting the cylindrical protuberance 38c or 32f against the stepped portion 32c in the smaller diameter portion 32b or the end surface 38b of the valve seat side, the reverse stop valve 25 of the release channel 26 may be formed to prevent the flow from the master cylinder side to the wheel cylinder side.

In these embodiments, by providing the cylindrical protuberance 38c or 32f, any obstacles such as a particle of dirt may be removed more easily, when any obstacles exist in the valve mechanism of the reverse stop valve 25, thereby offering an excellent contamination control.

This invention has the following advantages:

Providing the switching valve at the upstream side of the inlet valve not only reduces the fluid pulse created at the opening and closing operation of the inlet valve in hydraulic brake control but also attenuates the fluid pulse by using the throttled channel in communicating at the master cylinder side. Furthermore, the inner piston slides against the spring force when the inlet valve unit reaches the inner piston at the inlet valve seat. Thus, the metal sound or fluid pulse (NVH) created at the opening and closing of the valve unit may be absorbed by the deflection of the spring thereby showing the remarkable improvement in reducing NVH.

Since a channel from the switching valve to the inlet valve is placed almost in a straight line, a fluid flow becomes smoother. At the same time malfunction of the switching valve is effectively prevented by forming the auxiliary throttled channel in the bottom portion of the outer piston.

The valve mechanism of the switching valve comprises the cap member and the surface seal of the bottom portion of the outer piston, thereby providing more reliable closing of the switching valve. In addition, the release circuit of the fluid and the operation circuit of the outer piston are separated; thus, more accurate switching valve operation is possible.

The cylindrical protuberance can be formed at the end surface of the valve seat side of the inner piston or the stepped portion in the smaller diameter portion of the magnet core, to provide an anti-contamination effect on the reverse stop valve at the release channel.

When the hydraulic pressure of the master cylinder becomes lower because the release channel is formed between the smaller diameter portion of the magnet core and the inner piston, fluid in the master cylinder is certainly released via the release channel.

It is readily apparent that the above-described has the advantage or wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A hydraulic control valve device comprising:
    a sleeve fixed in a bore of a housing provided on a main braking line connecting between a master cylinder and a wheel cylinder,
    an armature slidably installed in said sleeve, and having an inlet valve unit which opens and closes by electromagnetic force,
    a magnet core, in which the inlet valve unit is installed, fixed in the bore of the housing together with the sleeve and having a smaller diameter portion extending into the bore,
    a coil assembly electromagnetically operating the armature,
    a valve mechanism inside said smaller diameter portion of the magnet core, a normally open inlet valve comprising the sleeve, the armature, the magnet core, the coil assembly, and the valve mechanism,
    a switching valve provided at the upstream side of said normally open inlet valve, wherein the switching valve provides an open channel between said master cylinder and wheel cylinder when in a normal braking and switches to a throttled channel operable by hydraulic pressure difference between the master cylinder side and wheel cylinder side when in hydraulic control, wherein the switching valve comprises:

an outer piston slidably provided exterior on the smaller diameter portion of said magnet core, dividing the bore formed in the housing into a first hydraulic chamber connected to the master cylinder and a second hydraulic chamber connected to the wheel cylinder, the outer piston being formed as a sleeve with a closed bottom portion, and an outer spring which presses said outer piston toward the bottom of the bore, wherein at least one communication hole functions as the main braking line at the bottom of the smaller diameter portion of the magnet core, and a throttled channel defined between the bottom of smaller diameter portion of the magnet core and the facing surface of the closed bottom portion of said outer piston facing said bottom of the smaller diameter portion which switches when said outer piston slides in the direction to close the communication hole functioning as the open channel by the pressure difference between the hydraulic pressure of the master cylinder side and the wheel cylinder side; and wherein the inlet valve comprises an inner piston slidably provided in the smaller diameter portion of the magnet core, an inlet valve seat formed on the surface of the inner piston facing the inlet valve unit, a cap member located at the distal end of the smaller diameter portion, and an inner spring between said inner piston and said cap member absorbing an operation impact of said valve mechanism comprising the inlet valve unit and inlet valve seat when closing the inlet valve, wherein the at least one communication hole, functioning as the main braking line, is provided in the cap member and said throttled channel is provided between the bottom of the cap member and the bottom portion of the outer piston facing the cap member and switches when said outer piston slides in the direction to close said at least one communication hole functioning as a large channel by the hydraulic pressure difference between the hydraulic pressure of said master cylinder side and wheel cylinder side.

2. A hydraulic control valve device as claimed in claim 1, wherein the throttled channel, connecting between the at least one communication hole in the cap member and a bore through the bottom portion of the outer piston, is formed in either the cap member or the facing surface of the bottom of the outer piston.

3. A hydraulic control valve device as claimed in claim 2, wherein a release channel is formed either between the inner piston and an inner circumferential surface of the smaller diameter portion or in the inner piston, and hydraulic pressure of the wheel cylinder is released to the master cylinder via the release channel when the hydraulic pressure of the master cylinder becomes lower than the certain amount below hydraulic pressure of the wheel cylinder.

4. A hydraulic control valve device as claimed in claim 3, wherein an auxiliary throttled channel is formed by a cavity or hole between the bottom portion of the outer piston and the bottom of the bore of the housing.

5. A hydraulic control valve device as claimed in claim 2, further comprising a reverse stop valve to prevent flow from the master cylinder side of the release channel to the wheel cylinder side, said stop valve comprising a cylindrical protuberance formed on one of the end surface of the valve seat side of the inner piston or a stepped portion in the smaller diameter portion of the magnet core facing the end surface of the valve seat side, flow through the release channel being stopped by said cylindrical protuberance and either the end surface of the valve seat side abutting against the cylindrical protuberance or the stepped portion in said smaller diameter portion abutting against the cylindrical protuberance.

6. A hydraulic control valve device as claimed in claim 2, wherein an auxiliary throttled channel is formed by a cavity or hole between the bottom portion of the outer piston and the bottom of the bore of the housing.

7. A hydraulic control valve device as claimed in claim 1, wherein a small diameter hole, functioning as the throttled channel communicating with a bore through the bottom portion of the outer piston is formed in the cap member.

8. A hydraulic control valve device as claimed in claim 7, wherein a release channel is formed either between the inner piston and an inner circumferential surface of the smaller diameter portion or in the inner piston, and hydraulic pressure of the wheel cylinder is released to the master cylinder via the release channel when the hydraulic pressure of the master cylinder becomes lower than the certain amount below hydraulic pressure of the wheel cylinder.

9. A hydraulic control valve device as claimed in claim 7, further comprising a reverse stop valve to prevent flow from the master cylinder side of the release channel to the wheel cylinder side, said stop valve comprising a cylindrical protuberance formed on one of the end surface of the valve seat side of the inner piston or a stepped portion in the smaller diameter portion of the magnet core facing the end surface of the valve seat side, flow through the release channel being stopped by said cylindrical protuberance and either the end surface of the valve seat side abutting against the cylindrical protuberance or the stepped portion in said smaller diameter portion abutting against the cylindrical protuberance.

10. A hydraulic control valve device as claimed in claim 7, wherein an auxiliary throttled channel is formed by a cavity or hole between the bottom portion of the outer piston and the bottom of the bore of the housing.

11. A hydraulic control valve device as claimed in claim 1, wherein a release channel is formed either between the inner piston and an inner circumferential surface of the smaller diameter portion or in the inner piston, and hydraulic pressure of the wheel cylinder is released to the master cylinder via the release channel when the hydraulic pressure of the master cylinder becomes lower than the certain amount below hydraulic pressure of the wheel cylinder.

12. A hydraulic control valve device as claimed in claim 11, further comprising a reverse stop valve to prevent flow from the master cylinder side of the release channel to the wheel cylinder side, said stop valve comprising a cylindrical protuberance formed on one of the end surface of the valve seat side of the inner piston or a stepped portion in the smaller diameter portion of the magnet core facing the end surface of the valve seat side, flow through the release channel being stopped by said cylindrical protuberance and either the end surface of the valve seat side abutting against the cylindrical protuberance or the stepped portion in said smaller diameter portion abutting against the cylindrical protuberance.

13. A hydraulic control valve device as claimed in claim 11, wherein an auxiliary throttled channel is formed by a cavity or hole between the bottom portion of the outer piston and the bottom of the bore of the housing.

14. A hydraulic control valve device as claimed in claim 1, further comprising a reverse stop valve to prevent flow from the master cylinder side of the release channel to the wheel cylinder side, said stop valve comprising a cylindrical protuberance formed on one of the end surface of the valve seat side of the inner piston or a stepped portion in the smaller diameter portion of the magnet core facing the end surface of the valve seat side, flow through the release channel being stopped by said cylindrical protuberance and the end surface of the valve seat side abutting against the cylindrical protuberance or the stepped portion in said smaller diameter portion abutting against the cylindrical protuberance.

15. A hydraulic control valve device as claimed in claim 1, wherein an auxiliary throttled channel is formed by a cavity or hole between the bottom portion of the outer piston and the bottom of the bore of the housing.

* * * * *